Dec. 17, 1929.  J. H. OLCOTT  1,740,112
SHUTTER LOCK FOR CAMERAS
Filed Nov. 7, 1927   2 Sheets-Sheet 1
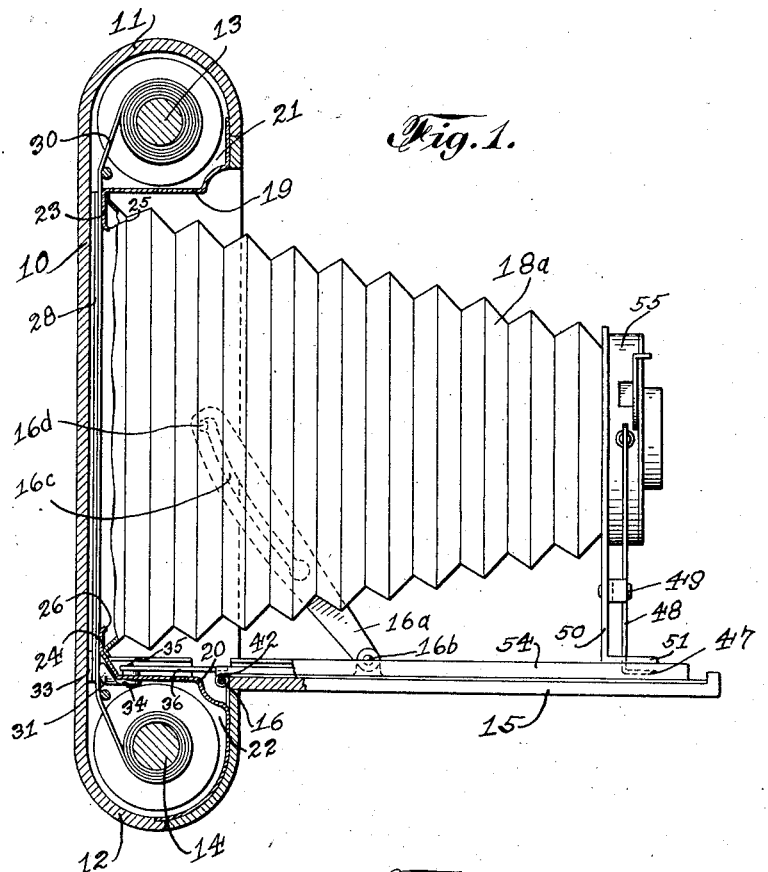
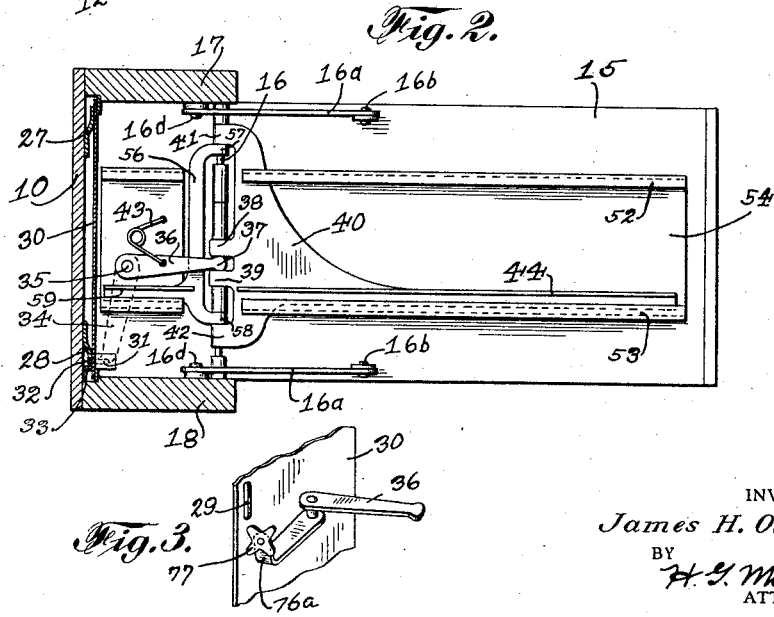
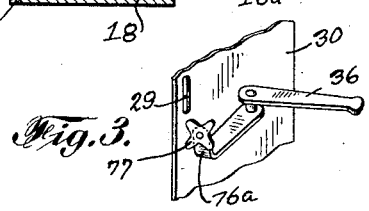
INVENTOR
James H. Olcott
BY
H. G. Manning
ATTORNEY Dec. 17, 1929.                J. H. OLCOTT                1,740,112
                         SHUTTER LOCK FOR CAMERAS
                          Filed Nov. 7, 1927          2 Sheets-Sheet 2
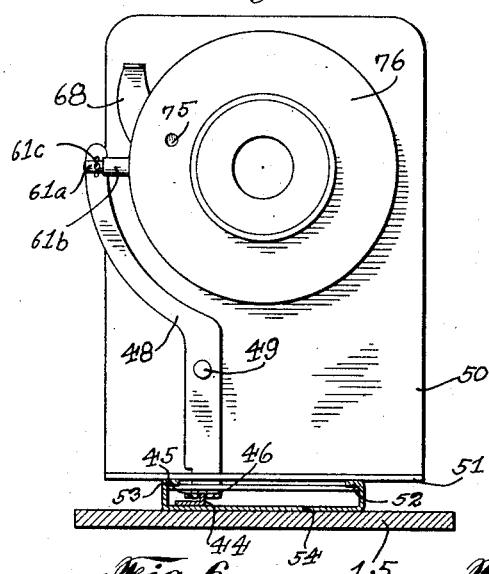
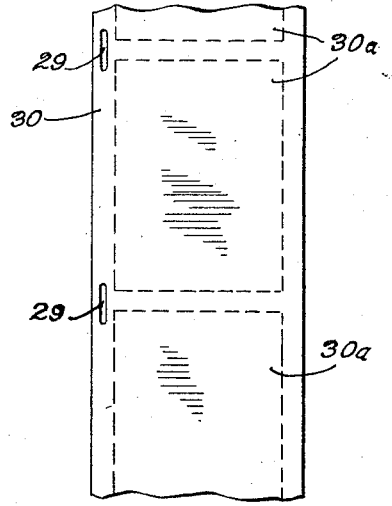
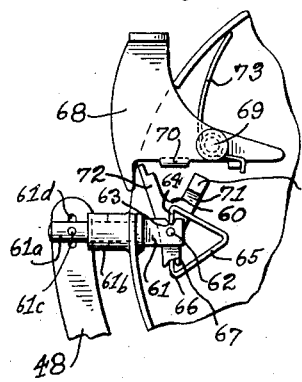
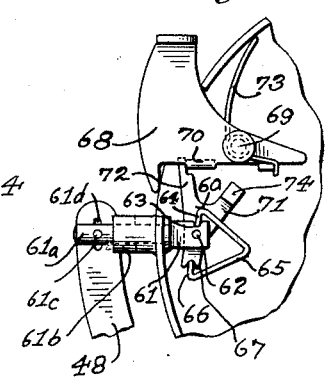
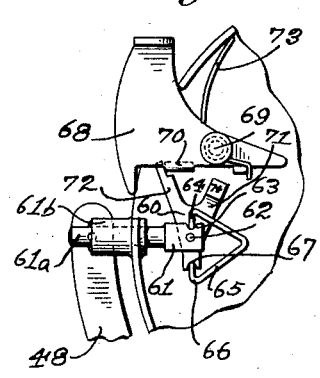
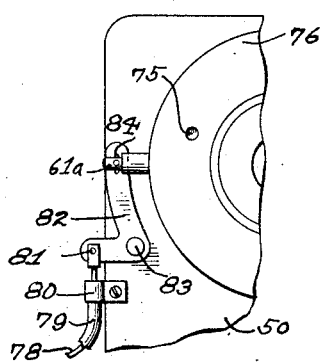
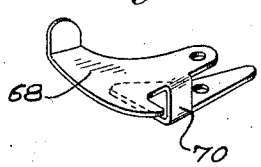
INVENTOR
James H. Olcott
BY
H. Y. Manning
ATTORNEY Patented Dec. 17, 1929

1,740,112

UNITED STATES PATENT OFFICE

JAMES H. OLCOTT, OF WATERBURY, CONNECTICUT

SHUTTER LOCK FOR CAMERAS

Application filed November 7, 1927. Serial No. 231,445.

This invention relates to film cameras, and more particularly to an attachment therefor which will prevent double exposures and overlapping pictures.

One object of this invention is to provide an attachment of the above nature by means of which the lens shutter will be automatically locked by the operation of taking an exposure and will be unlocked when the film has been wound sufficiently to bring an unexposed film into the focal plane.

A further object is to provide a device of the above nature having signal means for indicating to the operator when an exposed film requires to be wound up.

A further object is to provide locking means for a film camera adapted to prevent the shutter lever from being operated while an exposed film remains in the focal plane.

A further object is to provide a shutter locking attachment of the above nature which will be relatively simple in construction, inexpensive to manufacture, easy to install and manipulate, ornamental in appearance, and very efficient and durable in use.

With these and other objects in view there have been illustrated on the accompanying drawings several forms in which the invention may be conveniently embodied in practice.

Fig. 1 represents a side view, partly in section, of a camera embodying the preferred form of the invention.

Fig. 2 is a top sectional view of the same, showing a portion of the unlocking mechanism.

Fig. 3 is a fragmentary perspective view of a modified form of cam and lever adapted to be engaged by the slots of the film.

Fig. 4 is a front view of the preferred form of camera with the lens cover in assembled position.

Fig. 5 is a fragmentary view of a portion of a film to be used in the camera and showing two of the cam-operating slots.

Fig. 6 is a view of the shutter-operating mechanism and the locking means therefor, as they appear when the shutter lever is in normal unlocked position.

Fig. 7 is a view similar to Fig. 6 showing the appearance of the shutter lever in locked position immediately after an exposure has been taken.

Fig. 8 is a view similar to Figs. 6 and 7, showing the appearance of the shutter lever after the unlocking cam has entered the slot in the film.

Fig. 9 is a fragmentary view of a modified form of mechanism for transferring the motion of the unlocking cam to the shutter operating mechanism.

Fig. 10 is a perspective view of the shutter-operating lever.

Referring now to the drawings in which like reference numerals denote corresponding parts throughout the several views, the numeral 10 indicates the casing or body of a film-operated camera. The casing 10 is substantially rectangular in shape and has semi-cylindrical ends 11 and 12 for receiving a pair of film spools 13 and 14, it being understood that the sensitized film is to be wound intermittently from the spool 14 onto the spool 13 by means of a finger key, not shown, connected with the spool 13.

The front of the casing 10 is provided with a rectangular opening adapted to be closed by a cover 15, said cover being hinged to the bottom edge of said opening by a hinge pintle 16, said pintle extending across the entire width of the camera between the two sides 17 and 18 thereof. The cover 15 is detachably held in open position by a pair of arms 16ª pivoted to the cover at 16ᵇ. The arms 16ª have curved slots 16ᶜ and the free ends of said slots have offset portions for engaging pins 16ᵈ.

The roll of sensitized film 30 is adapted to be protected from exposure by a collapsible bellows 18ª and by a pair of cover plates 19 and 20 which serve to close the inner sides of the semi-cylindrical film roll chambers 21 and 22. The rear ends of the cover plates 19 and 20 are provided with inclined inwardly extending flanges 23 and 24 having forwardly curved extremities 25 and 26, said flanges serving to press the ends of the film 30 against a pair of resilient rear vertical strips 27 and 28 having raised sections, the raised section of the strip 28 being adapted to lie in alinement with a series of slots 29 of the film 30. The slots 29 are preferably positioned on the film between successive exposure areas 30ª thereof, as clearly shown in Fig. 5.

In order to operate the shutter-unlocking mechanism to be described later, provision is made of a curved cam 31 adapted to move in and out of said slots 29 and to pass through a slot 32 in alinement therewith formed in the raised section of the strip 28. The end of the strip 28 adjacent the receiving spool 14 is preferably provided with a supporting leg 33 for supporting the raised section thereof, and thereby preventing the film at this point from moving rearwardly with the cam 31. The cam 31 is integral with the forward upturned end of a cam holding arm 34, said arm 34 being rigidly secured to a rotary pivot pin 35 journaled in the cover plate 20. The inner end of said pivot pin 35 carries a tapered arm 36 having an enlarged free end 37 for engagement between a pair of parallel lugs 38 and 39 of a laterally sliding hinge plate 40. The hinge plate 40 has its ends 41 and 42 bent around the hinge pin 16, as clearly shown in Figs. 1 and 2, whereby when the cam 31 moves into one of the slots 29 of the film 30 under the influence of a spring 43, the arm 36 will be caused to move in a clockwise direction. This will force the laterally sliding plate 40 to move downwardly, as viewed in Fig. 2 carrying with it an upstanding flange 44.

The flange 44 lies between a pair of lugs 45 and 46 forming part of a forwardly extending flange 47 of a vertically extending bell-crank lever 48. The lever 48 is mounted upon a pin 49 carried on an upstanding supporting bracket 50, said bracket 50 having a base flange 51 straddling and adapted to slide upon a pair of inturned ribs 52 and 53 of a channel member 54, the latter being permanently attached to the inside of the cover member 15.

It will be evident from the foregoing construction that the bell-crank lever 48 will be rotated about its pivot 49 whenever the cam lever 31 moves into or out of the slot 29 of the film 30. When the cam 31 enters a slot 29, the rotation of the cam lever will be in a clockwise direction, as viewed in Fig. 3, and when it leaves said slot, the rotation will be counter-clockwise. This will cause the lever 48 to move in the same directions, whereby a plunger 61ª on the shutter mechanism will be moved to the right and left respectively, as viewed in Fig. 4.

The levers 31 and 48 will be rotated as just described no matter what position the supporting bracket 50 may happen to occupy along the channel member 54, thus making it possible for the user to wind up the film on the receiving spool to bring the next unexposed portion of the film into the focal plane, irrespective of the position of the lens and its casing. Means are also provided to permit the above actions to take place when the lens casing 55 is at its innermost collapsed position within the camera casing 10. This means comprises an interior plate member 56 having bent-over ends 57 and 58 mounted on the hinge pin 16 between the bent-ends 41 and 42. The plate member 56 also has its rear end provided with an upstanding flange 59 in alinement with the flange 44.

By means of the above construction, when the lens casing 55 is moved to collapsed position, the lugs 45 and 46 on the lower end of the bell-crank lever 48 will ride off from the flange 44 and onto the flange 59, thus permitting the shutter to be unlocked by the engagement of the cam 31 in the film slot 29 at all times.

The mechanism for locking the shutter after an exposure has been made, so as to prevent a second exposure until the film-winding key is next operated comprises a plunger 61ª having a pin 61ᶜ engaging in a slot 61ᵈ of the bell-crank lever 48, said plunger being slidably held in a tube 61ᵇ. Provision is also made of a Y-shaped locking lever 60, which, as clearly shown in Fig. 6, is pivotally carried upon the inner end 61 of the plunger 61ª by a pin 62. The plunger 61ª is provided with a notch 63 on its upper side, said notch being positioned vertically above the pin 62 for receiving one bent-in extremity 64 of a triangular shaped spring 65, the other bent-in extremity 66 of said triangular spring being seated in a notch 67 in the lower end or tail of said locking lever 60.

The extremities 64 and 66 of the triangular spring 65 are located in alinement, whereby when the locking lever 60 is in the vertical position shown in Figs. 6 and 8, there will be no tendency for rotation of the locking lever on account of the fact that the pivot pin 62 lies directly between said extremities 64 and 66. When, however, the locking lever 60 is shifted from this vertical position, as when the shutter lever 68 is pushed down about its fulcrum pin 69 to expose a film, the bridge member 70 of said shutter lever 68 will engage the right-hand upper arm 71 of the locking lever 60 and cause the latter to rotate from the position shown in Fig. 6 to the position shown in Fig. 7. The triangular spring 65 will then become active and will press the shouldered arm 72 of said locking lever against said bridge 70. Subsequently, when the shutter lever 68 has risen to its original position under the action of its spring 73, the shoulder of the arm 72 will snap under the edge of said bridge 70 into locking position.

In order to indicate to the user when a film has been exposed and that it should be wound upon the receiving spool, the arm 71 of the locking lever 60 is provided with a signal section 74, preferably colored red, said section 74 being visible through a small sight open ing 75 in the front cover 76 of the lens casing 55. The locking lever 60 will then be in the locked position shown in Fig. 7. When, however, the locking lever 60 is in the unlocked position shown in Fig. 6, the sight opening 75 will be out of alinement with signal section 74 and the operator will know that the camera is ready for taking the next exposure.

In operation, assuming the locking lever to be in its normal position as shown in Fig. 6, whenever the user desires to take an exposure, he will press down upon the shutter lever 68 exposing the film for the desired interval. The rotation of the shutter lever 68 will cause the bridge section 70 to engage the indicating signal arm 71 of the locking lever 60, forcing the latter in a clockwise direction. This will cause the lower tail section of the locking lever 60 to pass out of alinement with the notch 63 and the pin 62. The triangular spring 65 will then become effective and will press the locking lever 60 in a clockwise direction. The user will then release the shutter lever 68 which will be automatically retracted by the spring 73 to its normal upper position, whereupon the shoulder on the arm 72 will snap into locking engagement with the bridge 70 of the shutter lever 68, as shown in Fig. 7 of the drawing. The shutter will then remain locked until the operator has rotated the receiving spool sufficiently to bring an unexposed section of the film 30 nearly into alinement with the focal plane. The cam 31 will then be forced by its spring actuated cam lever to enter the slots 29 and 32, and the arm 36 of the cam lever will move the rib 44 to the left, as viewed in Fig. 4. The bell-crank lever 48 will thus be rotated in a clockwise direction, causing the plunger 61$^a$ to slide in its collar 61$^b$ and carry inwardly the locking lever 60. The bridge 70 will then act as a fulcrum, and the locking lever 60 will be caused to travel about its shoulder arm from the position shown in Fig. 7 to the position shown in Fig. 8. As the film is wound still further to bring it exactly into the focal plane, the cam 31 will be forced out of the slot 29 in the film 30, whereupon the plunger 61$^a$ will be retracted from the position shown in Fig. 8 to its original position shown in Fig. 6, thereby pulling the locking lever 60 back to the left and withdrawing the shouldered arm 72 from its engagement with the bridge 70 of the shutter lever 68. The parts will then be in their original unlocked condition ready for the next exposure to be taken.

In Fig. 3 a modified form of cam for engagement with the slots 29 of the film 30 has been illustrated. In this form, the upper arm 36 of the cam lever is identical with the upper arm of the first form of the invention. The lower arm of the cam lever, however, is provided on its upturned end 76$^a$ with a pivoted four-arm star-wheel 77, the teeth of which are adapted to successively enter the slots 29 of the film 30. The cam lever will thus be caused to move the required distance for operating the shutter lock-release mechanism.

In Fig. 9 a modified form of operating connection between the film-operated cam and the plunger 61$^a$ is illustrated. This form of connection differs from the previous form in that the cam lever, sliding plate, and bell-crank lever are replaced by a spring-operated flexible shaft 78 carried within a flexible tube 79. The tube 79 is adapted to be secured to the plate 50 by a collar bracket 80 and the end of the shaft 78 is pivotally connected, as by a pin 81, to a short bell-crank lever 82 fulcrumed at 83 and having a slotted connection at its other extremity 84 to the plunger 61$^a$.

While there have been disclosed in this specification several forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a shutter-locking device for a film camera, a shutter mechanism for exposing the film, a lever for operating said shutter mechanism, a film having slots adjacent its edge, a spring-pressed cam adapted to enter said slots successively as the film is wound up, said shutter mechanism having a Y-shaped locking lever, one arm of said locking lever lying in the path of said shutter lever, a second arm on said locking lever for locking said shutter lever against a double exposure, and a third arm on said locking lever operatively connected with said cam for unlocking said shutter lever when the cam has moved into the next slot in the film.

2. In a shutter-locking device for a film camera, a shutter mechanism for exposing the film, a lever for operating said shutter mechanism, a film having slots adjacent its edge, a spring-pressed cam adapted to enter said slots successively as the film is wound up, said shutter mechanism having a spring-pressed locking lever rocked by the operation of said shutter lever into position for locking said shutter lever against a double exposure, said locking lever having an arm actuated by said cam for sliding said locking lever into position for unlocking said shutter lever when the film has been wound up to bring the next exposure area to the focal plane position and cause said cam to enter the next slot.

3. In a shutter-locking device for a film camera, a shutter mechanism for exposing the film, a lever for operating said shutter mechanism, a film having slots adjacent its edge, a spring-pressed cam adapted to enter said slots successively as the film is wound up, a slidable locking lever actuated by the operation of said shutter lever for locking said shutter lever against a double exposure, a slidable plunger for pivotally carrying said locking lever, and means connecting said cam and plunger for causing said plunger to move said locking lever into position for unlocking said shutter lever when the film has been wound up to bring the next exposure area to the focal plane position and the cam has entered the next slot.

4. In a shutter-locking device for a film camera, a shutter mechanism for exposing the film, a lever for operating said shutter mechanism, a film having slots adjacent its edge, a spring-pressed cam adapted to enter said slots successively as the film is wound up, a locking lever actuated by the operation of said shutter lever for locking said shutter lever against a double exposure, a slidable plunger pivotally carrying said locking lever, a vertical bell-crank lever pivoted to said plunger, and mechanism actuated by said cam for operating said bell-crank lever for causing said plunger to slide back and forth for unlocking said shutter lever when the film has been wound up to bring the next exposure area to the focal plane position.

5. In a shutter-locking device for a film camera, a shutter mechanism for exposing the film, a lever for operating said shutter mechanism, a film having slots adjacent its edge, a spring-pressed cam adapted to enter said slots successively as the film is wound up, a locking lever actuated by the operation of said shutter lever for locking said shutter lever against a double exposure, a sliding plunger pivotally carrying said locking lever, a vertical bell-crank lever slidably pivoted to said plunger, and mechanism actuated by said cam for operating said bell-crank lever for causing said plunger to slide back and forth for unlocking said shutter lever when the film has been wound up to bring the next exposure area to the focal plane position.

6. In a shutter-locking device for a film camera, a camera casing having a hinged cover, a lens support having a shutter, a trigger for operating said shutter, a film having slots in its edge between exposure areas, a lever having a cam located in alinement with said slots, means for causing said cam to enter said slots successively as the film is wound up, a laterally slidable plate mounted in said hinged cover and being operatively engaged by said cam lever, a vertical lever pivoted to said lens support and being engaged by said slidable plate, means actuated by the operation of said trigger for locking it against a double exposure, and means actuated by said vertical lever for unlocking said trigger when the cam enters the next slot in the film.

7. In a shutter-locking device for a film camera, a camera casing having a hinged cover, a lens support having a shutter, a trigger for operating said shutter, a film having slots in its edge between exposure areas, a lever having a cam located in alinement with said slots, means for causing said cam to enter said slots successively as the film is wound up, a laterally slidable plate mounted in said hinged cover and being operatively engaged by said cam lever, a vertical lever pivoted to said lens support and being engaged by said slidable plate, means actuated by the operation of said trigger for locking it against a double exposure, and means actuated by said vertical lever for unlocking said trigger when the cam enters the next slot in the film, said lens support having slidable engagement with said cover during the opening and closing thereof, whereby said trigger may be unlocked with the lens in any position.

8. In a shutter-locking device for a camera, a shutter mechanism, a film having slots in its edge, a rotatable star-shaped cam wheel pivotally mounted on a spring-pressed cam lever, the teeth of said wheel lying in alinement with and being adapted to successively enter said slots, means actuated by the operation of said shutter mechanism for locking it against a double exposure, and means actuated by the movement of said cam lever when a tooth of said star wheel enters the next slot in the film for unlocking said shutter mechanism.

9. In a film camera, a lens casing, a shutter-operating lever, a Y-shaped locking lever pivoted on said casing and having an arm in the path of said shutter-operating lever and adapted to be swung thereby into locking position wherein a second actuation of said shutter-operating lever will be prevented until the next film has been wound into the focal plane, said casing having a signal opening and a distinguishable signal section on said locking lever visible through the opening in said lens casing when the locking lever has been swung into locked position to indicate when the film requires to be wound upon its receiving spool.

In testimony whereof, I have affixed my signature to this specification.

JAMES H. OLCOTT.